(12) United States Patent
Wubbels et al.

(10) Patent No.: US 7,395,649 B2
(45) Date of Patent: Jul. 8, 2008

(54) GATHERING AND PICKING DEVICE

(75) Inventors: Richard Wubbels, Rhede (DE);
Norbert Wolters, Gescher (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/282,273

(22) Filed: Oct. 28, 2002

(65) Prior Publication Data
US 2003/0079458 A1    May 1, 2003

(30) Foreign Application Priority Data
Oct. 27, 2001    (DE) ................. 101 53 198

(51) Int. Cl.
*A01D 45/02*    (2006.01)
(52) U.S. Cl. .......................... 56/52; 56/14.3
(58) Field of Classification Search ............ 56/14.3, 56/12.3, 94, 52, 53, 110, 119, 107, 14.5, 56/64, 95, 103
See application file for complete search history.

(56) References Cited

U.S. PATENT DOCUMENTS

| | | | |
|---|---|---|---|
| 2,110,471 A | 3/1938 | Petruchkin | 56/64 |
| 2,440,791 A | 5/1948 | Welty | 56/18 |
| 2,501,782 A | 3/1950 | Mock | 56/110 |
| 2,571,865 A | 10/1951 | Greedy et al. | 56/64 |
| 2,870,593 A * | 1/1959 | Anderson | 56/104 |
| 4,377,062 A * | 3/1983 | Slattery | 56/14.3 |
| 5,076,046 A * | 12/1991 | Schilling | 56/327.1 |
| 6,055,799 A * | 5/2000 | Savoie et al. | 56/16.4 R |
| 6,119,443 A | 9/2000 | Rauch | 56/64 |
| 2002/0014064 A1 | 2/2002 | Wubbels et al. | 56/95 |

FOREIGN PATENT DOCUMENTS

| | | |
|---|---|---|
| DE | 197 34 747 A1 | 2/1999 |
| DE | 199 59 281 A1 | 6/2001 |
| EP | 1 161 857 A1 | 12/2001 |
| FR | 1 269 522 | 8/1961 |

* cited by examiner

*Primary Examiner*—Árpád Fábián-Kovács

(57) ABSTRACT

A gathering and picking device comprising a picking gap, which is used to separate fruits from plants standing on a field. The gathering and picking device is provided with a first feed element operating at a first feeding speed and a second feed element operating at a second feeding speed. Both feed elements are located adjacent to the input region of the picking gap. The second feed element is arranged above the first feed element. Both feed elements cooperate to convey the plants into the picking gap. The second feeding speed is higher than the first feeding speed to slope the plants rearward as they engage the feeding elements.

20 Claims, 2 Drawing Sheets

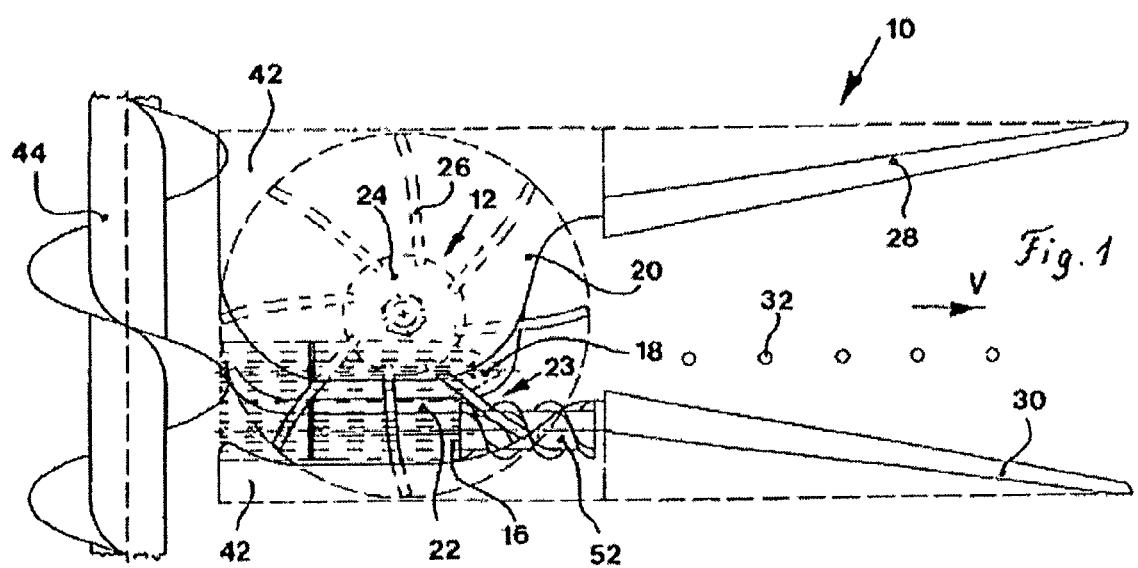
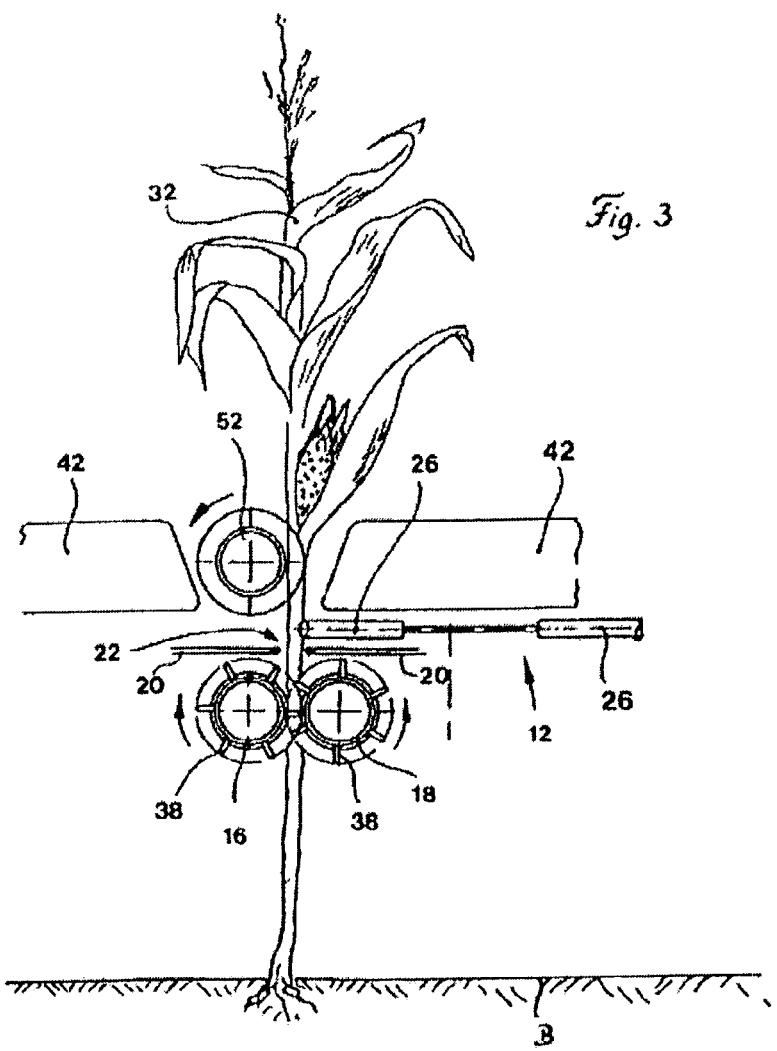

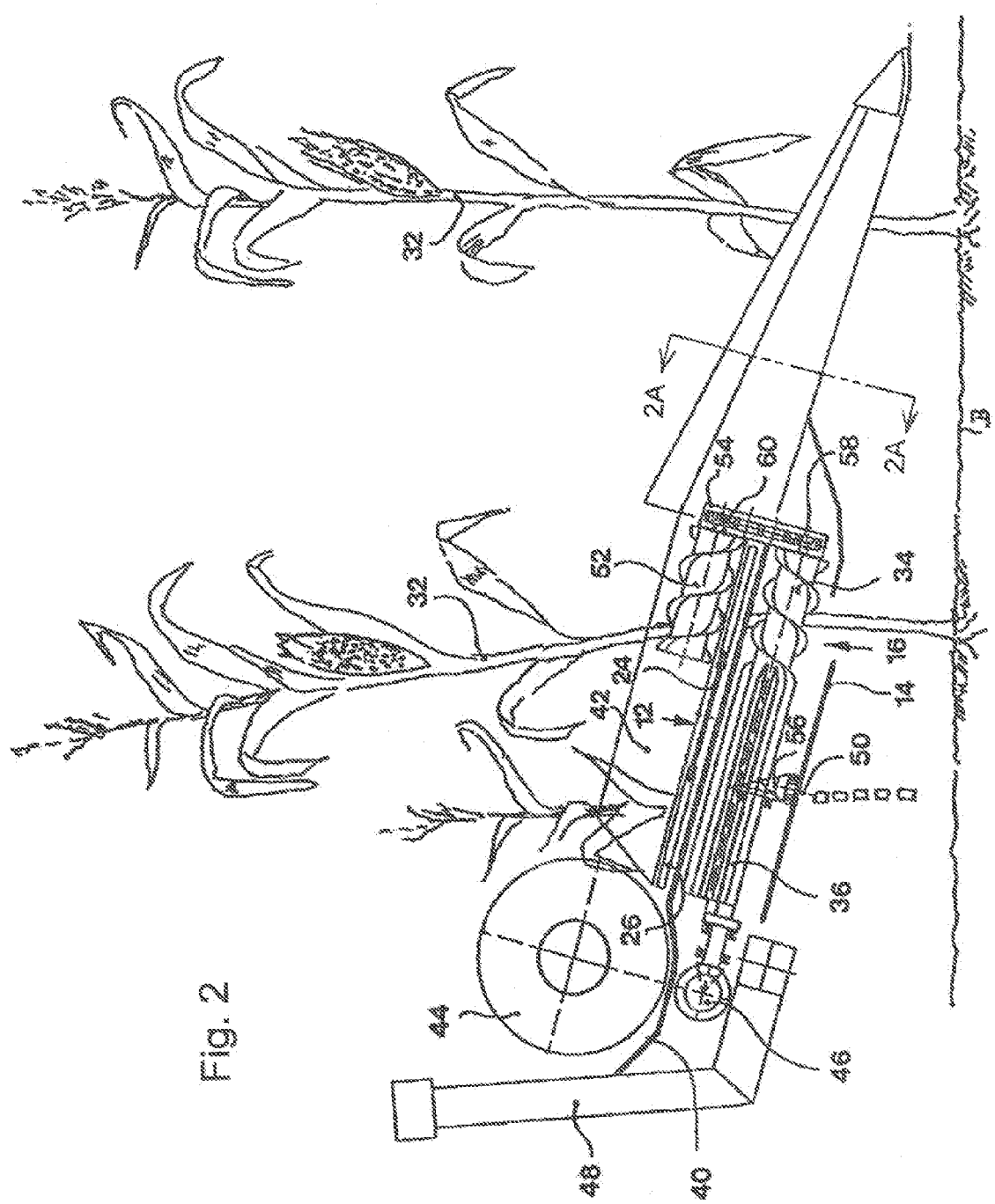

GATHERING AND PICKING DEVICE

FIELD OF THE INVENTION

The present invention is directed to a gathering and picking device for a harvesting machine.

BACKGROUND OF THE INVENTION

Pickers are used in agricultural harvesting to separate the fruits of plants from the other parts of the plants. Such pickers generally have two picking rolls, between which the plant stem is pulled in. Occasionally only one picking roll is used, which cooperates with a fixed wall. The picking roll or rolls pull the plants through a picking gap, whose dimensions are narrower than the fruit. Because of this, the fruit, for example, a corn cob, is separated from the rest of the plant and can be processed separately.

In the corn picker disclosed in U.S. Pat. No. 2,571,865 A, plant stems are gathered by a chain conveyor having carriers which draw the stems into and through the picking gap. A feed auger is arranged on the side of the picking gap opposite and above the chain conveyor. The feed auger is the first moving part of the picker that comes in contact with the corn stems. Its purpose is to convey the stems uniformly to the site at which the stems come in contact with rotating blades acting as picking rolls. The feed auger also ends at roughly this site. U.S. Pat. No. 4,377,062 A discloses a corn picker in which a feed auger is arranged above the picking rolls. It conveys plant stems into and through the picking gap. It also transports the picked fruits away. On the side of the picking gap opposite from the feed auger, a lower gathering wheel is located at the inlet beneath the picking gap. An upper gathering wheel is arranged coaxially to the lower gathering wheel above the feed auger. The gathering wheels are used to convey the plants into the picking gap.

A corn harvester attachment device for a self-propelled harvesting machine is disclosed in U.S. Pat. No. 6,119,443. The device mows the plants standing on a field, independently of the row, and picks the corn cobs from the plants. The device comprises a rotating conveying disc provided with recesses and a rotating blade located beneath the conveying disc. The plants are fed to conventional picking units mounted downstream of the mower. Clean-out disks or tips of picking rolls that extend into the rolling circle of the mower are provided in order to remove the plants being processed from the mower and introduce them to the picking unit. The separated cobs of the plants are transported through two chain conveyors arranged above the picking gap. A drawback here is considered to be the fact that the transfer of ripe, soft stems into the picking unit can be problematical. In the U.S. published patent application Ser. No. 2002/0014064, a gathering and picking device for picking of stem-like plants is described in which the plants are brought into a picking gap by a gathering element rotating around a roughly vertical axis. At the inlet of the picking gap, two feed elements are provided in the form of feed augers, one of which is arranged above the picking gap and the other beneath it. The two feeders are arranged on the side of the picking gap opposite the gathering element and have the same feed speeds. The upper gathering element prevents especially ripened, soft plants from kinking at the input to the picking gap, at which they are deflected rearward at a relatively acute angle. Owing to the same feed speeds of the two feeders, the plant remains in a vertical position.

SUMMARY OF THE INVENTION

It is an object of the present invention to provide an improved gathering and picking device.

The first feed element and the second feed element convey the plants to the input region of the picking gap, i.e., convey them in a feed direction running in the longitudinal direction of the picking gap. The second feed element is locate above the first feed element. The feed speed of the second feed element is greater than the feed speed of the first feed element.

With this speed differential, the upper part of the plant slopes rearward toward the picking gap. Because of this, the upper part of the plant moves more quickly into a position above the picking device than with a plant whose original vertical orientation is maintained. By this effect, the multiple fruits of the plant can be introduced more quickly and more reliably into the picking gap. Thereby reducing the loss of useful parts of the plant. In addition, fewer undesired plant residues are found between the multiple fruits.

In the illustrated embodiment two cooperating feed elements are arranged on the same side of the picking gap. Bending moments that bend the plants across the picking gap are avoided by locating them on the same side rather than on opposite sides.

In the illustrated embodiment a gathering element that grasps parts of plants, especially stems, and introduces them into the picking gap is arranged on the side of the picking gap opposite the second feed element. The gathering element preferably has a relatively large working width; it therefore operates independently of rows. The plants transported by the gathering element to the input end of the picking gap, before reaching the picking device, come in contact with the first and second feed elements. The second feed element conveys the plants in cooperation with the first feed element and the gathering element into the picking gap. The second feed element slopes the plants over the picking gap, because of its higher feed speed relative to the first feed element. The feed direction of the feed elements and the longitudinal direction of the picking gap run preferably parallel to each other, so that the feed elements can introduce the plants without problem into the picking gap.

Non-problematical introduction of the plants into the picking gap is guaranteed, especially with relatively soft stems, by the second feed element, since it permits additional support and feed of the plants. Because of the support action of the second feed element, kinking or crushing of the plants between the gathering element and the edge of the picking gap need not be feared. The gathering element, against which the plants lie, supports the plants opposite its feed direction and on the side opposite the second feed element.

The gathering element can also serve to transport the plants over the effective length of the picking device, accordingly, the part of the length of the picking device in which the picking device processes the plants, i.e., pulls in and separates the useful parts from the remainder of the plants.

The gathering element can rotate around a predominantly vertical axis and be provided with outward facing fingers that serve to grasp and transport parts, especially stems, of the plants. The use of a known chain conveyor with carriers would also be conceivable. The chain conveyor can have a track that runs transverse to the forward direction of movement of the gathering and picking device, in order to achieve an increase in working width. An additional track would then pull the plants into the picking gap.

The fingers of the rotating gathering element preferably have leading surfaces with deflecting feed behavior and therefore force the penetrating plant parts outward. This feed behavior can be achieved by a trailing curvature of the fingers of the gathering element against the direction of rotation. Owing to the fact that a stem of a plant is forced outward by the gathering element, a situation is achieved in which one avoids aggressive pulling of the stems inward and clamping between the stripping plate and the fingers. As an alternative, or in addition to the curvature of the fingers, a controlled radial or azimuthal movement of the fingers relative to the shaft of the gathering element would be conceivable, as is known of winders or feed screws of cutting machines and can be achieved by an eccentric control, among other things, in order to achieve a deflecting feed behavior.

In the illustrated embodiment, the second feed element is arranged above the picking gap, and also above the gathering element. Because of this, a situation is achieved in which the plants essentially cannot be bent between the second feed element and the gathering element, which would hamper introduction into the picking gap.

The first picking element, on the other hand, is preferably arranged beneath the picking gap. There it can offer the necessary holding to maintain the plant in a roughly vertical position.

The first and/or second feed element are preferably feed augers that extends over a region (relative to the direction of movement of the plants) upstream of the picking gap and over at least part of the length of the picking gap. It is certainly conceivable to have it run over the entire length of the picking gap, in order to transport the plants along the picking gap, which, however, is not absolutely necessary, since transport of the plants over the length of the picking gap can occur by the gathering element or another feeder, for example, a picking roll provided with spiral-shaped carriers. For cost and weight reasons, a relatively short feed auger is illustrated, which only covers the input end of the picking gap and a region in front of it and behind it, viewed in the direction of movement of the plants. Instead of a feed auger, a chain conveyor with carriers can be used to grasp and introduce the plants into the picking gap.

The different feed speeds of the first and second feed elements can be achieved by different speeds and/or different pitches of the feed spiral and/or different diameters. Different speeds can be achieved by independent drives, for example, hydraulic motors. Drive of the second feed element can also occur through the first feed element or vice versa, in which a gear mechanism is present between them. By appropriate choice of the transmission ratio of the linkage, the desired rotational speed and linear speed ratio is achieved. It is also conceivable to connect a variator drive between the first and second feed elements or vice versa, instead of a gear mechanism with a fixed transmission.

The first feed element is preferably directly mounted to a picking roll, the first feed element would extend upstream from the first picking roll. The first feed element is therefore mounted coaxially with the picking roll.

A gear mechanism that produces a drive connection between a driven picking roll of the picking device and/or the first feed element, and the second feed element can be used to drive the second feed element. The gear mechanism is advantageously arranged on the end of the picking roll with the second feed element lying upstream (with reference to the direction of motion of the plants). This end generally lies forward in the forward direction of travel of the gathering and picking device.

In principle, it would be conceivable to support the second feed element on both of its ends on a fixed element on the frame (directly or indirectly). Generally, however, it is sufficient to rotationally support it only on one end. The end of the second feed element facing the gear mechanism is then expediently involved.

The first feed element and the second feed element preferably end precisely one above the other. The picking rolls begin to act on the plants at this location and pull them in downward.

BRIEF DESCRIPTION OF THE DRAWINGS

FIG. 1 shows a top view of a gathering and picking device of a harvesting machine.
FIG. 2 shows a side view of a gathering and picking device from FIG. 1.
FIG. 2A shows a section view of Fig 2.
FIG. 3 shows a vertical section through the gathering and picking device from FIG. 1.

DETAILED DESCRIPTION

A gathering and picking device 10 is shown in FIG. 1. A harvesting machine generally has a number of gathering and picking devices 10, although it would also be conceivable to provide a harvesting machine with only a single gathering and picking device 10. If several gathering and picking devices 10 are used, they can be configured identically or symmetrically relative to the longitudinal center plane of the harvesting machine.

The gathering and picking device 10 has an upper gathering element 12 that serves to grasp and pull in the plants being harvested, a rotatable chopping blade 14, as well as a picking device with a first picking roll 16 and a second picking roll 18, that are arranged beneath a picking gap 22 made in a stripper plate 20.

The gathering element 12 is arranged to rotate around a predominantly vertically running axis and is placed in rotation by a drive (not apparent in the drawings) in the clockwise direction in FIG. 1. The gathering element 12 is arranged above the stripper plate 20 and has a slightly forward sloped rotational axis, since line B represents the ground line in FIG. 2. The gathering element 12 comprises a central disk 24, with predominantly radially extending fingers 26 distributed over its periphery that are curved in the plane of the disk 24 against the direction of rotation, i.e., are trailing. The fingers 26 therefore have a deflecting feed behavior.

As is apparent in the top view shown in FIG. 1 of the gathering and picking device 10, stem dividers 28 and 30 are arranged ahead of the gathering element 12 in the forward direction of movement V of the harvesting machine. The dividers 28 and 30 force the plants 32 that do not stand precisely in front of the gathering element 12 inward and bends them so that they reach the effective region of the gathering element 12. The edge of the stripping plate 20, also running in the forward direction of movement V, is curved so that the stems of the plants 32 are forced into the effective region the gathering element 12. The effective region of the gathering element 12 is large enough that the gathering and picking device 10 operates independently of rows in cooperation with the curved edge of the stripping plate 20 and the stem dividers 28 and 30. The working width of the gathering and picking device 10 corresponds to the lateral spacing of the tips of the stem dividers 28 and 30.

The method of operation of the gathering element 12 is readily apparent from FIG. 1. A stem of a plant 32 standing on the field may come into contact directly with a finger 26 of the gathering element 12; or (depending on its lateral position) come into contact after it was bent by the stem divider 28, 30 and/or the leading edge of the stripping plate 20. The gathering element 12 directs the stalk to the picking gap 22. The stem is guided by the leading surface of finger 26 and pushed outward, owing to the trailing and therefore deflecting curvature of finger 26. In this manner, the stem of plant 32 is transported by finger 26 into the picking gap 22, which extends at least roughly parallel to the forward direction of movement V. The gathering element 12 traps the plant 32 against the first picking roll 16 and directs it to the stripping plate 20. The plant 32, still not separated from the soil of the field (see FIG. 3), is then bent, if necessary.

The first picking roll 16 is arranged laterally next to the gathering element 12 and sloped slightly forward and downward. Viewed in the lateral direction, it is oriented parallel to the forward direction of movement V. In the vertical direction, the first picking roll 16 is arranged beneath the stripper plate 20. The front region of the first picking roll 16 is provided with an auger 34. The auger 34 pulls the stems of plants 32 into the picking gap 22 in cooperation with the gathering element 12. The region 23 of picking gap 22 on the input side lies in front of the rotational axis of the gathering element 12 at the site where the initially narrowing distance between the two parts of the cover plate 20 have assumed a constant value over the length of the picking gap 22 in the direction movement of plants 32. The output end region of picking gap 22, however, is curved in the direction of the rotational axis of gathering element 12.

When the plants 32 enter the picking gap 22, a relatively obtuse angle is produced between the fingers 26 of the gathering element 12 and the edge of the stripping plate 20 opposite them (shown on the bottom of FIG. 1). The stems of plants 32, because of this obtuse angle between stripping plate 20 and fingers 26, can be crushed, especially if a strongly ripened and therefore soft stem of corn plants is involved. The plant 32, in this case may clog the gathering and picking device 10.

To solve this problem, a second feed element 52 in the form of an auger is arranged above the region 23 of the picking gap 22 on the input side above the gathering element 12. The feed direction of the second feed element 52 extends parallel to the first picking roll 16. The second feed element 52 has about 1/3 the length of the first picking roll 16 and is placed in rotation by means of a gear mechanism 54, which produces a drive connection with the front face of the first picking roll 16. The first picking roll 16 therefore conveys the drive torque from the shaft 46 to the second feed element 52. The housing of the feed mechanism 54 is fastened to the stripper plate 20. The second feed element 52 is mounted only on its front face in the forward direction of travel V on gear mechanism 54, but is not mounted or supported on its rear face. The gear mechanism 54 includes a lower gear 58 arranged coaxial with the first picking roll 16 on its face and driven by the picking roll 16. The lower gear 58 meshes with an upper gear 60 that is arranged coaxial with the second feed element 52 and is rigidly connected to it via a shaft. The upper gear 60 has fewer teeth than the lower gear 58, so that the second feed element 52 is driven with a higher speed than the first picking roll 16 and the auger 34.

The stem of a plant 32 grasped by a finger 26 of the gathering element 12 is forced by the finger 26 against the second feed element 52. The auger 34 serves as a first feed element.

The feed rate of the second feed element 52 is therefore somewhat higher than that of the auger 34. The speed of the region of the gathering element 12 in contact with the plant 32 conveyed by the two feed elements lies between these two speeds. Because of this, the plant 32 is brought by the feed elements and gathering element 12 rearward into the picking gap 22, in which its upper part, because of the higher feed rate of the second feed element 52, is bent rearward in the feed direction in picking gap 22, which is apparent with reference to the plant 32 shown on the left in FIG. 2. Because of this, a situation is achieved in which any fruit falling off because of the acceleration acting on it does not reach the ground, but enters the effective region of the feed device 12, which feeds it to transverse auger 44.

The second feed element 52 provides the plant 32 with support and conveyance above the finger 26 of gathering element 12. By the interaction of the two feed elements and finger 26, the plant 32 is securely held and guided linearly into the picking gap 22 and between the picking rolls 16 and 18 and, the plants upper regions are sloped slightly rearward. The plant is supported at three points, so that kinking or crushing need no longer be feared. In addition, the gathering behavior of the gathering and picking device 10 is much more aggressive because of the second feed element 52.

As a result, the stem of plant 32, by the feed action of screw feed 34, second feed element 52 and gathering element 12, reaches the effective region of the second picking roll 18, whose front tip (with reference to the forward direction of motion V) also lies in front of the rotational axis of gathering element 12. The second picking roll 18 is oriented parallel to the first picking roll 16 and arranged between the latter and the rotational axis of the gathering element 12. The gap defined between the first picking roll 16 and the second picking roll 18 is located vertically beneath the picking gap 22. The rear region 36 of the first picking roll 16, whose length corresponds to the length of the second picking roll 18, and the second picking roll 18 are provided in known fashion with axially arranged flutes 38, as are best illustrated in FIG. 3. With reference to FIG. 3, the first picking roll 16 rotates clockwise, the second picking roll 18 counterclockwise. The first picking roll 16 and the second picking roll 18 cooperate to pull the stem of plant 32 downward. The stripper plate 20 strips off the useful parts of the plant 32 as it is rapidly pulled down by the pickling rolls 16 and 18.

The second feed element 52 ends precisely above the front end of the second picking roll 18 and the beginning of the rear region 36 of the first picking roll 16. As soon as the plant 32 is pulled downwardly by the picking rolls 16 and 18, the second feed element 52 and the auger 34 of the first picking roll 16 ends.

During the picking process, the fingers 26 of gathering element 12 act so that the plant 32 is transported over the length of the picking gap 22. The rotational speeds of the picking rolls 16 and 18 and the gathering element 12 are preferably set so that the entire plant 22 is pulled downward into the picking gap 22, when the end of picking gap 22 is reached.

The useful parts of plants 32, separated by the picking device, like corn cobs, multiple fruits of sunflowers, etc., are conveyed by the gathering element 12 into a trough 40 arranged on the back side of the gathering and picking device 10. A cover 42 on both sides of the picking gap 22 defines a channel leading to trough 40 through which the useful parts of plants 32 are conveyed. The cover 42 fully covers the gathering element 12 and partially covers the second feed element 52 and, because of its shielding effect, increases the functional and operating reliability of the gathering and picking device 10. The trough 40, with stripping plate 20, can be a single part or multiple parts. A transverse auger 44 is arranged above trough 40 and transports the useful parts to a harvesting vehicle (for example, a thresher or field chopper) or to a trailer. A shaft 46 for driving the two picking rolls 16 and 18, the chopping blade 14, the feed element 52 and the gathering element 12 is located beneath the trough 40. The shaft 46 is daringly connected to the motor of a vehicle carrying the harvesting machine. A frame 48 carries gathering and picking devices 10 of the harvesting machine, which are all driven by shaft 46.

The rest of plant 32 that is transported downward by picking rolls 16 and 18 enters the effective region of the rotating, four-armed cutting blade 14 and is cut into small pieces. Chopped plant remains are therefore deposited on the field. During chopping, the picking rolls 16 and 18 securely hold plant 32. The chopping blade 14 rotates around a predominantly vertical rotational axis 50 that is arranged between the rotational axis of gathering element 12 and the transverse auger 44 as is illustrated in FIG. 2. The chopping blades are driven by the shaft 46 through an angular gear 56. In the vertical direction, the chopping blade 14 is positioned beneath the picking rolls 16 and 18. The direction of rotation of the chopping blade 14, if one considers FIG. 1, is clockwise, so that the chopped product is ejected laterally rearward.

Having described the illustrated embodiment, it will become apparent that various modifications can be made without departing from the scope of the invention as defined in the accompanying claims.

The invention claimed is:

1. A gathering and picking device on a harvesting machine having a forward direction of movement, comprising:
   a picking gap that is set up to separate fruits from plants standing on a field, the picking gap having an input region;
   a first feed element located adjacent to the input region of the picking gap and oriented parallel to the forward direction of movement, the first feed element rotates at a first speed;
   a second feed element arranged above and parallel to the first feed element, the second feed element rotates at a second speed higher than the first speed, wherein the first and second feed elements cooperate to convey the plants into the picking gap.

2. A gathering and picking device as defined by claim 1 wherein the first feed element and the second feed element are arranged on the same side of the picking gap.

3. A gathering and picking device as defined by claim 2 wherein a gathering element is arranged on the side of the picking gap opposite from the second feed element.

4. A gathering and picking device as defined by claim 3 wherein the picking gap has a length, the gathering element transports the plants over the length of picking gap.

5. A gathering and picking device as defined by claim 4 wherein the gathering element is driven to rotate around a predominantly vertical axis.

6. A gathering and picking device as defined by claim 5 wherein the second feed element is located above the picking gap.

7. A gathering and picking device as defined by claim 6 wherein the second feed element is located above the gathering element.

8. A gathering and picking device as defined by claim 5 wherein the second feed element is located above the gathering element.

9. A gathering and picking device as defined by claim 5 wherein the first feed element is arranged beneath the picking gap.

10. A gathering and picking device as defined by claim 6 wherein the first feed element is arranged beneath the picking gap.

11. A gathering and picking device as defined by claim 7 wherein the first feed element is arranged beneath the picking gap.

12. A gathering and picking device as defined by claim 8 wherein the first feed element is arranged beneath the picking gap.

13. A gathering and picking device as defined by claim 11 wherein the first feed element is a feed auger extending over a region upstream from the input region of the picking gap.

14. A gathering and picking device as defined by claim 13 wherein the second feed element is a feed auger extending upstream from the input region and over at least part of the length of picking gap.

15. A gathering and picking device as defined by claim 11 wherein the second feed element is a feed auger extending upstream from the input region and over at least part of the length of picking gap.

16. A gathering and picking device as defined by claim 1 further comprising a picking roll attached to the first feed element.

17. A gathering and picking device as defined by claim 16 wherein the second feed element is driven by a gear mechanism which is driven by the first feed element.

18. A gathering and picking device as defined by claim 1 wherein the second feed element is driven by a gear mechanism which is driven by the first feed element.

19. A gathering and picking device as defined by claim 18 wherein the second feed element is supported on the gear mechanism.

20. A gathering and picking device as defined by claim 1 wherein the first feed element has a first downstream end and the second feed element has a second downstream end, the first downstream end and the second downstream end lie one above the other.

* * * * *